US011058956B2

(12) United States Patent
Baszucki

(10) Patent No.: US 11,058,956 B2
(45) Date of Patent: Jul. 13, 2021

(54) CONSENT VERIFICATION

(71) Applicant: Roblox Corporation, San Mateo, CA (US)

(72) Inventor: David Baszucki, Portola Valley, CA (US)

(73) Assignee: Roblox Corporation, San Mateo, CA (US)

(*) Notice: Subject to any disclaimer, the term of this patent is extended or adjusted under 35 U.S.C. 154(b) by 190 days.

(21) Appl. No.: 16/244,209

(22) Filed: Jan. 10, 2019

(65) Prior Publication Data

US 2020/0222813 A1 Jul. 16, 2020

(51) Int. Cl.
*A63F 9/24* (2006.01)
*A63F 13/792* (2014.01)
*A63F 13/25* (2014.01)

(52) U.S. Cl.
CPC ............ *A63F 13/792* (2014.09); *A63F 13/25* (2014.09)

(58) Field of Classification Search
CPC ............ G06F 2221/2149; H04L 63/12; A63F 13/792; A63F 13/25
See application file for complete search history.

(56) References Cited

U.S. PATENT DOCUMENTS

| 8,700,524 B2* | 4/2014 | Williams | H04W 4/24 705/39 |
| 8,904,494 B2* | 12/2014 | Kindler | H04L 63/08 726/4 |
| 2002/0184496 A1 | 12/2002 | Mitchell et al. | |
| 2009/0161838 A1* | 6/2009 | Schultz | H04L 65/40 379/88.04 |
| 2009/0232129 A1* | 9/2009 | Wong | H04L 65/1089 370/352 |
| 2011/0072039 A1* | 3/2011 | Tayloe | H04L 63/12 707/769 |
| 2011/0167342 A1 | 7/2011 | De La Pena et al. | |
| 2012/0047560 A1* | 2/2012 | Underwood | G06F 21/30 726/4 |
| 2013/0254288 A1 | 9/2013 | Harrison | |
| 2014/0150068 A1* | 5/2014 | Janzer | H04L 63/20 726/4 |
| 2018/0247385 A1 | 8/2018 | Whitfield et al. | |

OTHER PUBLICATIONS

Federal Trade Commission, "Children's online privacy protection rule: A six-step compliance plan for your business", (https://www.ftc.gov/tips-advice/business-center/guidance/childrens-online-privacy-protection-rule-six-step-compliance), Jun. 30, 2017.
WIPO, International Search Report and Written Opinion mailed for International application No. PCT/US2019/052795, dated Dec. 3, 2019, 13 pages.

* cited by examiner

*Primary Examiner* — Dmitry Suhol
*Assistant Examiner* — Carl V Larsen
(74) *Attorney, Agent, or Firm* — IP Spring

(57) ABSTRACT

A method and system is disclosed that permits consent verification within an online gaming platform.

20 Claims, 6 Drawing Sheets

CONSENT VERIFICATION

FIELD

This disclosure relates to online gaming platforms and, in particular, to methods, system and computer readable media for consent verification within online gaming platforms.

BACKGROUND

Online gaming platforms, allow users to connect with each other, interact with each other (e.g., within a game) and share information with each other via the Internet. Users of online gaming platforms may participate in multiplayer gaming environments, design custom gaming environments, decorate avatars, exchange virtual items with other users, communicate with other users, and so forth.

In order to protect the privacy of users and/or to comply with rules, laws, internal policies, or industry best practices, consent may be required for users to participate in one or more features provided by an online gaming platform. For example, consent can include consent of an adult for a child user to access one or more features of an online gaming platform. Verification of such consent can be challenging within a distributed environment such as that provided by an online gaming platform.

Some implementations were conceived in light of the above-mentioned challenges, among other things.

SUMMARY

Some implementations can include a method. The method can include receiving an indication that consent is required to enable one or more features associated with a user account in an online gaming platform, and initiating a first video communication session between the online gaming platform and a device associated with the user account, wherein the first video communication session includes a first person as a participant. The method can also include detecting presence of a second person as a participant within the first video communication session, wherein the second person is participating via the device associated with the user account, and receiving an indication that a consent verification process is permitted by the device associated with the user account.

The method can further include initiating a second video communication session between the online gaming platform, the device associated with the user account, and one or more consent verification system operator devices associated with a consent verification system, wherein the second video communication session includes participation of the second person, and receiving a consent verification response from the consent verification system. The method can also include, if the consent verification response indicates consent is verified, enabling the one or more features associated with the user account.

In some implementations, if the consent verification response indicates consent is verified, the consent verification response includes an indication that a majority of one or more consent verification operators corresponding to the one or more consent verification system operator devices provided an indication that the second person in the second video communication session is an adult.

The method can further include causing a user interface to appear on a display of the device associated with the user account, wherein the user interface includes a prompt and an element to receive a response to the prompt, and receiving the response to the prompt at the online gaming platform. The method can also include comparing the response to the prompt with stored information associated with the user account to determine whether the response is correct, and enabling the one or more features associated with the user account if both the consent verification response indicates consent is verified and the response to the prompt is correct.

In some implementations, the prompt corresponds to the stored information, and wherein the stored information corresponds to a detail about the user account. In some implementations, the detail about the user account includes one or more of a birth date of a user associated with the user account, a billing detail of the user account, an email address associated with the user account, or a password associated with the user account. In some implementations, initiating the second video communications session includes modifying the first video communication session to add the one or more consent verification system operator devices associated with the consent verification system as participants.

Some implementations can include a system comprising a memory, and a processing device, coupled to the memory. The processing device configured to receive an indication that consent is required to enable one or more features associated with a user account in an online gaming platform, and initiate a video communication session between the online gaming platform and a device associated with the user account, wherein the video communication session includes a person as a participant. The processing device also configured to receive an indication that a consent verification process has been initialized by the device associated with the user account, and join one or more consent verification system operator devices associated with a consent verification system to the video communication session.

The processing device further configured to receive a consent verification response from the consent verification system, and if the consent verification response indicates consent is verified, enable the one or more features associated with the user account.

In some implementations, if the consent verification response indicates consent is verified, the consent verification response includes an indication that a majority of one or more consent verification operators corresponding to the one or more consent verification system operator devices provided an indication that the person in the video communication session appears to be an adult.

In some implementations, the processing device is further configured to cause a user interface to appear on a display of the device associated with the user account, wherein the user interface includes a prompt and an element to receive a response to the prompt, and receive the response to the prompt at the online gaming platform. The processing device is also configured to compare the response to the prompt with stored information associated with the user account, and enable the one or more features associated with the user account if both the consent verification response indicates consent is verified and the response to the prompt is correct.

In some implementations, the prompt corresponds to the stored information, and wherein the stored information represents a detail about the user account. In some implementations, the detail about the user account includes one or more of a birth date of a user associated with the user, a billing detail of the user account, an email address associated with the user account, or a password associated with the user account.

In some implementations, initiating the video communications session includes modifying the video communication session to add the one or more consent verification system operator devices associated with the consent verification system as participants.

Some implementations can include a non-transitory computer-readable medium comprising instructions that, responsive to execution by a processing device, cause the processing device to receive an indication that consent is required to enable one or more features associated with a user account in an online gaming platform, and initiate a video communication session between the online gaming platform and a device associated with the user account, wherein the video communication session includes a person as a participant. The instruction also cause the processing device to receive an indication that a consent verification process has been accepted by the device associated with the user account, and join one or more consent verification system operator devices associated with a consent verification system to the video communication session. The instructions further cause the processing device to receive a consent verification response from the consent verification system, and, if the consent verification response indicates consent is verified, enable the one or more features associated with the user account.

In some implementations, if the consent verification response indicates consent is verified, the consent verification response includes an indication that a majority of one or more consent verification operators corresponding to the one or more consent verification system operator devices provided an indication that the person in the video communication session appears to be an adult.

In some implementations, the instructions are further operable to cause the processing device to cause a user interface to appear on a display of the device associated with the user account, wherein the user interface includes a prompt and an element to receive a response to the prompt, and receive the response to the prompt at the online gaming platform. The instructions are further operable to cause the processing device to compare the response to the prompt with stored information associated with the user account, and enable the one or more features associated with the user account if both the consent verification response indicates consent is verified and the response to the prompt is correct.

In some implementations, the prompt corresponds to the stored information, and wherein the stored information represents a detail about the user account. In some implementations, the detail about the user account includes one or more of a birth date of a user associated with the user, a billing detail of the user account, an email address associated with the user account, or a password associated with the user account.

In some implementations, initiating the video communications session includes modifying the video communication session to add the one or more consent verification system operator devices associated with the consent verification system as participants.

In some implementations, the instructions are further operable to cause the processing device to determine that another person is participating in the video communication session, and, if the other person is participating in the video communication session, join the one or more consent verification system operator devices associated with the consent verification system to the video communication session. In some implementations, at least one of the one or more consent verification system operator devices is an automated consent verification operator system.

BRIEF DESCRIPTION OF THE DRAWINGS

Various implementations of the disclosure will be understood more fully from the detailed description given below and from the accompanying drawings of various implementations of the disclosure.

DETAILED DESCRIPTION

Figure 1:
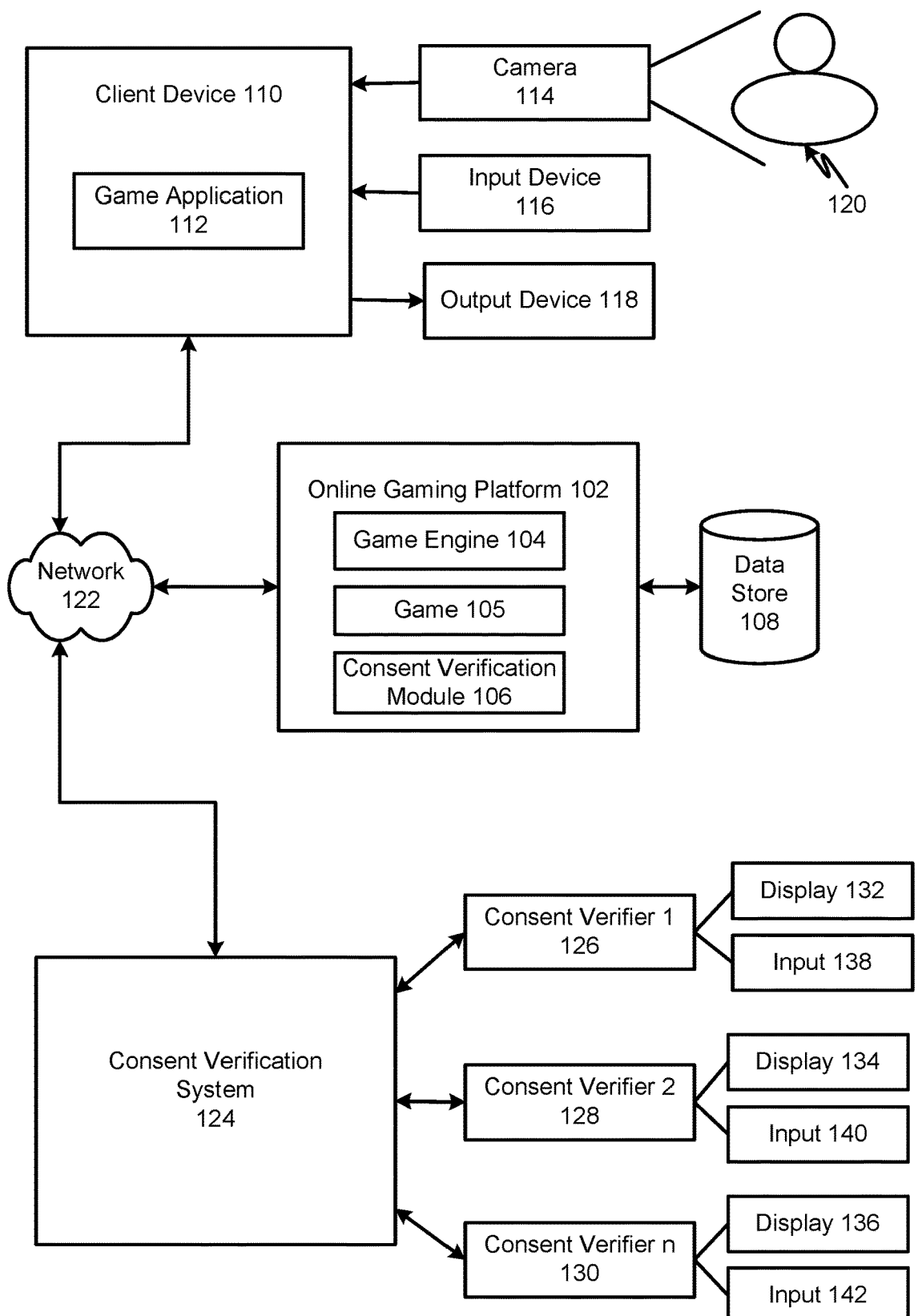
FIG. 1 illustrates an example system architecture and operational environment of an online gaming platform in accordance with some implementations.

Online gaming platforms (also referred to as "user-generated content platforms" or "user-generated content systems" herein) offer a variety of ways for users to interact with one another. For example, users of an online gaming platform may work together towards a common goal, share various virtual gaming items, send electronic messages to one another, and so forth. Users (e.g., playing users) of an online gaming platform may play games using characters. An online gaming platform may also allow users of the platform to communicate with each other. For example, users of the online gaming platform may communicate with each other using voice messages (e.g., via voice "chat"), text messaging, video messaging, or a combination of the above.

Some of the features of the online gaming platform may require consent (e.g., consent of an adult) for a user account (e.g., an account of a child) to access certain features (e.g., communication features, etc.). Accordingly, aspects of the disclosed subject matter provide users the ability to indicate consent and for the online gaming platform to receive a verification of such consent.

In particular, some implementations address technological challenges of consent verification and improve the process of obtaining and verifying consent on an online gaming platform. For example, providing consent from a user device that is remotely connected to the online gaming platform presents one or more technical problems associated with providing consent in a way that is verifiable at a remote distance. For example, some technical problems can include identity verification of consent provider, verifying that video consent is live and/or genuine, verifying that person providing consent has knowledge of user for whom consent is being provided, or person providing consent is present with user, etc. Some implementations solve one or more of the technical problems by permitting the user device to supply video consent (e.g., video captured via a camera and microphone coupled to the user device) to the online gaming platform. The capture video consent can be electronically transmitted to the online gaming platform. Video consent is used an illustrative example herein. The consent can also be in other forms, such as a still picture with or without audio (e.g., a still picture of the person giving consent, or of an identification document of the person giving consent, such as a driver's license, passport, government issued identification card, etc.). In general, any format of consent that can convey that the person giving consent is, or appears to be, an adult (or meets other criteria required for consent) can be used.

Once the video consent is received at the online gaming platform, other technical and operational challenges present themselves. For example, verifying that consent was provided by a person that appears to be an adult may be a technically challenging determination for an online gaming platform to make automatically. Accordingly, having human verification of consent or a combination of human and automatic verification may provide a reliable way to verify consent. However, in an online gaming platform that may have many users distributed geographically, human verification may be difficult and/or costly to obtain. Some implementations address this technical challenge by providing a verification system through which one or more verification operators can view captured video consent and can provide verification (or confirmation) of such consent (e.g., provide verification that the person providing consent appears to be an adult). Also, the consent video may be stored and associated with the user account to provide documentation of the online gaming platform having received the consent. Because human verification may be subjective and based on the opinion of the verifier as to whether the consent video is of an adult, the consent verification system may send the consent video to a plurality of consent verification operators (e.g., 3) and only verify consent when a majority of the consent verification operators (e.g., 2 of 3) indicate that the person providing consent appeared to be an adult. In some implementations, verification operators may be employees, consultants, or recruited from the community. Using multiple operators for each review, an assessment of the quality of individual operators can be made and each operator can be assigned a reputation/quality score. If that score falls below a specified threshold then the operator may be excluded from future tasks. Going further, previously known outcomes can be used to test operator performance and/or onboard new operators. One or more of the consent verification operators may be a computer system that is programmatically analyzing the consent video and providing an indication of whether an automatic determination is made that the person providing consent in the video appears to be an adult. In addition, to help remove any possible subjectivity and to help confirm verification is being provided by a person with personal knowledge of the user, the online gaming platform and/or consent verification system, may request that the person in video providing consent also provide another piece of information that can help confirm that the person providing consent has personal knowledge of the user for which consent is being provided. For example, the online gaming platform and/or consent verification system may request the person providing consent to enter a birth date for the user for which consent is being provided. For example, information provided by the verifier may be compared against other data sources (e.g., in house data sources and/or 3rd party data sources) to validate the authenticity of the information being provided The birth date can be checked against information associated with the user account and verified to provide an indication that the person providing consent has personal knowledge of the user for which consent is being provided. Other information could be used to verify that the person providing consent has personal knowledge of the user for which consent is being provided, for example, an email address associated with the account, a phone number associated with the account, or a billing method detail associated with the account, etc. could be provided.

By combining the verification of consent via video from the consent verification operators via the consent verification system and the optional verification of personal knowledge of the user for which consent is being provided, the online gaming platform can document that a reasonable effort was made to obtain verification and that such verification was based on information provided such as video and one or more answers to corresponding questions or prompts. The information provided for the consent verification can be stored (e.g., with permission of the person providing consent) and associated with the user account to document consent verification for the user. In other implementations, the consent video and/or answers to questions may not be stored to help protect privacy of the user and/or person providing consent.

Verifying consent within an online gaming platform can help enhance the privacy and entertainment of users within the online gaming platform. Some implementations also improve the operation of a computer or computer network at least by distributing computational intensive operations (e.g., computer processing operations, computer storage operations, etc.) among client devices, the online gaming platform (e.g., server devices), and/or the consent verification system. Distributing the computational operations reduces the computational operations that are performed by the online gaming platform and frees computational resources (e.g., computer processing resources, computer storage resources, etc.) of the online gaming platform for other tasks. For example, capturing of consent verification video may be performed by client devices using the computational resources of the client device, rather than the computational resources of the online gaming platform. Additionally, data related to consent verification may be stored on client devices prior to upload reducing storage overhead of the online gaming platform.

It may be noted that an online gaming platform implementation is provided for purposes of illustration, rather than limitation. In general, a platform for which consent verification is being provided can include one or more of numerous platforms, such as a gaming platform, a social networking platform, a purchasing platform, an ecommerce platform, a messaging platform, a creation platform, and so forth. It may be further noted that aspects of the disclosure are illustrated using an example of a gaming platform and games for purposes of illustration, rather than limitation. Aspects of the present disclosure may be applied to various platforms.

FIG. 1 illustrates an example system architecture 100, in accordance with some implementations of the disclosure. The system architecture 100 (also referred to as "system" herein) includes an online gaming platform 102, a client device 110 (generally referred to as "client device(s) 110" herein), a network 122, and a verification system 124. The online gaming platform 102 can include, among other things, a game engine 104, one or more games 105, a consent verification application 106, and a data store 108. The client system 110 can include a game application 112 and be coupled to a camera 114, an input device 116, and an output device 118. Consent verification can be part of the game application 112 or a separate application. The verification system 124 can be coupled to one or more verifier systems (126, 128, and 130), which, in turn, are connected to respective displays (132, 134, 136) and respective input devices (138, 140, and 142). System architecture 100 is provided for illustration, rather than limitation. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., a webpage) or application back-end software that may be used to provide a user with access to content provided by online gaming platform 102. For example, users may access online gaming platform 102 using the game application 112 on client devices 110.

In some implementations, online gaming platform 102 may be a type of social network providing connections between users or a type of user-generated content system that allows users (e.g., end-users or consumers) to communicate with other users on the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users, such as playing users may participate in gameplay with other playing users. In some implementations, a game may be played in real-time with other users of the game.

In some implementations, gameplay may refer to interaction of one or more players with a game (e.g., user inputs) or the presentation of the interaction on a display or other output device (e.g., 118) of a client device 110.

In some implementations, a game 105 can include an electronic file that can be executed or loaded using software, firmware or hardware configured to present the game content (e.g., digital media item) to an entity. In some implementations, a game application 112 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 using a game application 112 of client devices 110. Users of the online gaming platform 102 may play, create, interact with, or build games 105, communicate with other users, and/or create and build objects (e.g., also referred to as "item(s)" or "game objects" or "virtual game item(s)" herein) of games 105. For example, in generating user-generated virtual items, users may create characters, decoration for the characters, one or more virtual environments for an interactive game, or build structures used in a game 105, among others. In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in game applications 105/112 of the online gaming platform 102. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 102 using user account information (e.g., a user account identifier such as username and password).

In some implementations, online gaming platform 102 or client devices 110 may include a game engine 104 or game application 112. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game engine 104 of client devices 110 may work independently, in collaboration with game engine 104 of online gaming platform 102, or a combination of both.

In some implementations, both the online gaming platform 102 and client device 110 execute a game engine (104, 112, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client device 110. For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a particular game 105 exceeds a threshold number, the online gaming platform 102 may perform one or more game engine functions that were previously performed by client device 110.

For example, playing users may be playing a game 105 on client devices 110 and may send control instructions (e.g., user inputs, such as right, left, up, down, user election, or character position and velocity information, etc.) to the online gaming platform 102. Subsequent to receiving control instructions from the client devices 110, the online gaming platform 102 may send gameplay instructions (e.g., position and velocity information of the characters participating in the group gameplay or commands, such as rendering commands, collision commands, etc.) to the client devices 110 based on control instructions. For instance, the online gaming platform 102 may perform one or more logical operations (e.g., using game engine 124) on the control instructions to generate gameplay instruction for the client device 110. In other instances, online gaming platform 102 may pass one or more or the control instructions from one client device 110 to other client devices participating in the game 105. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device, where the other client device generates gameplay instructions using the local game engine 104. The control instructions may include instructions to play a voice communication message from another user on an audio device (e.g., speakers, headphones, etc.).

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others.

In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via. In some implementations, the game catalog includes images of games stored on the online gaming platform 102. In addition, a user may select a character (created by the playing user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character includes a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming platform 102 at any given moment. It may be noted that the number of client devices 110 is provided as illustration, rather than limitation. In some implementations, any number of client devices 110 may be used.

In some implementations, each client device 110 may include an instance of the game application 112. In one implementation, the game application 112 may permit users to use and interact with online gaming platform 102, such as control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming platform application for users to build, create, edit, upload content to the online gaming platform 102 as well as interact with online gaming platform 102 (e.g., play games 105 hosted by online gaming platform 102). As such, the game application may be provided to the client device 110 by the online gaming platform 102. In another example, the game application may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described in one implementation as being performed by the online gaming platform 102 can also be performed by the client device(s) 110, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a verification module 106. In some implementations, the verification module 106 may be a system, application, or module that permits the online gaming platform 102 to verify consent provided by a person (e.g., 120) via the client device 110. In some implementations, the verification module 106 may perform one or more of the operations described below in connection with the flowcharts shown in FIGS. 2 and 3.

One or more of the functionalities described below may require consent (e.g., consent of an adult) for the one or more functionalities to be activated in a user account (e.g., an account of a child). For example, in some implementations, users of online gaming platform 102 may have base functionalities to interact with other users of online gaming platform 102. By establishing a friendship with another user, a user may be allowed to access additional functionalities (also referred to as "privileges" or "additional privileges" herein) of the online gaming platform 102 that allow the friends greater opportunity to interact with one another. In some implementations, users of online gaming platform 102 that are friends may be able to use the base functionalities and the additional functionalities in response to establishing a friendship.

In some implementations, the additional functionality may include messaging functionality that allows user A (e.g., user of client device 110) and user B (e.g., user of another client device) to communicate using a messaging service via the online gaming platform 102 (e.g., posts, chats, personal messages, public messages, messaging in a virtual gaming environment, video, etc.). For example, the messaging functionality may allow users to transmit messages to each other. For example, online gaming platform 102 may include one or more users capable of establishing friendships that cause online gaming platform 102 to grant additional functionality.

In some implementations, an additional functionality may include a sharing functionality that allows user A and user B to share items with each other via the online gaming platform 102. For example, users of the online gaming platform 102 may have a sharing functionality that allows users to purchase, trade, or transfer virtual items, such as virtual currency, in a virtual gaming environment.

In some implementations, an additional functionality may include a following functionality that allows user A and user B to follow each other into a game or into a specific gaming environment of a game hosted by the online gaming platform 102. For example, user A may be participating in a game. The following functionality may allow user B to navigate to a profile page of user A and select an option, "Join Game," on user A's profile page, which places user B in the game (e.g., the specific gaming environment of the game where user A is participating). In some implementations, the following functionality may also include a notification feature that for example, notifies user B of the game in which user A has moved or is currently participating.

In some implementations, an additional functionality may include an invitation functionality that allows user A and user B to invite each other to a private game hosted by the online gaming platform 102. For example, user A may create a private game and the invitation functionality may allow user A to invite user B to participate in the private game.

In some implementations, an additional functionality may include a group functionality that allows user A and user B to join a group hosted by the online gaming platform 102. For example, the additional functionality may allow user A to invite user B to a group where user A is a group member or group creator. Members of a group may participate with each other to compete against a different group in a game, may participate with each other in building (e.g., environments, structures, etc.) within a game, and may participate with each other to create a game.

In some implementations, an additional functionality includes an interaction functionality that allows user A and user B to interact with each other via the online gaming platform 102. For example, the base functionality may allow a user to participate in single-player games (but not multi-player games) and the interaction functionality may allow the user to participate in multi-player games. In another example, the base functionality may allow user A to compete against other users in a game and the interaction functionality may allow user A to work together with user B to compete against other users in a game. It may be noted that the additional functionalities described herein are provided for purposes of illustration, rather than limitation. In other implementations, other features of the online gaming platform 102 may be included in the additional functionalities that are provided in view of establishing a friendship.

One or more of the additional functionality described above may be functions or features for which consent is required and may need to be verified before one or more of the additional functions or features are enabled.

In situations in which the systems discussed here collect personal information about users, or may make use of personal information, the users may be provided with an opportunity to control whether the online gaming platform 102 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the online gaming platform 102.

Figure 2:
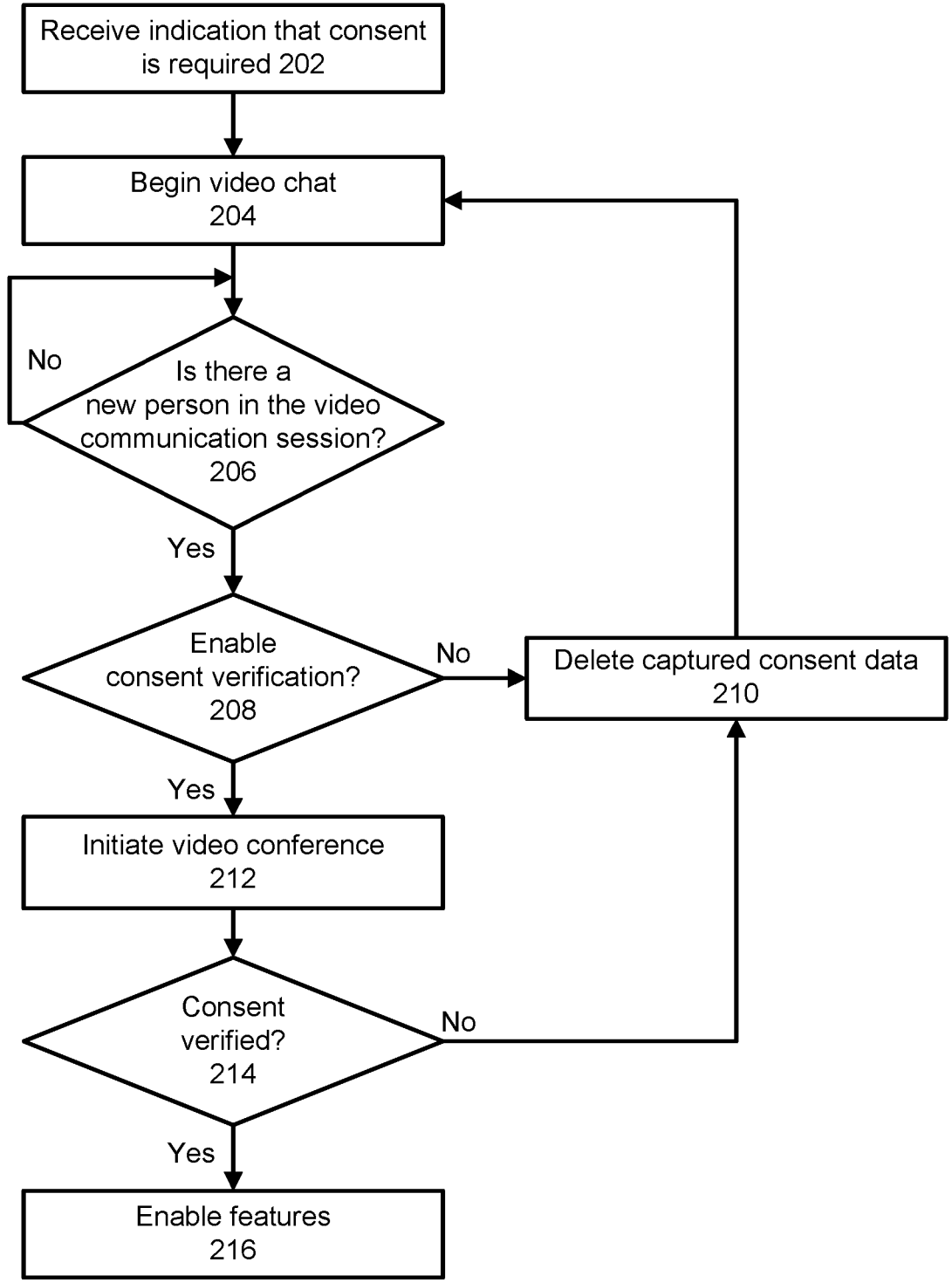
FIG. 2 is a flowchart illustrating an example method to verify consent on an online gaming platform between the online gaming platform and a user system, in accordance with implementations of the disclosure.

FIG. 2 is a flowchart illustrating an example method 200 to verify consent on an online gaming platform (e.g., 102), in accordance with implementations of the disclosure. Method 200 may be performed by processing logic that includes hardware (e.g., circuitry, dedicated logic, programmable logic, microcode), software (e.g., instructions run on a processing device to perform hardware simulation), or a combination thereof. In some implementations, the consent verification module 106 executing at the online gaming platform 102 may perform some or all the operations. In other implementations, the consent verification module 106 executing at online gaming platform 102, client device 110A, client device 110B, server 130 or combination thereof may perform some or all the operations. It may be noted that the in some implementations, method 200 may include the same, different, fewer, or a greater number of operations performed in any order.

Processing begins at 202, where an indication that consent is required is received. The indication that consent is required may be received based on a user action by a user of a client device, such as trying to access or activate a feature for which consent is required. For example, in a user account associated with a minor or a child, accessing or activating communication features (e.g., voice, video, or text chat) may require adult (or parental) consent. Other examples of actions that may require consent can include: buying in-game merchandise, buying avatar or player upgrades (e.g., powerups, etc.) or enhancements, attempting to play a team-game with non-approved friends, trying to play a team game with other participants who are adults, and/or installing a new game/module. Other user actions or events that may require consent can include purchases, text chat with other users, voice or video chat with other users, playing games rated for teens or adults, trading virtual goods or currency, submitting a game or content onto the platform, submitting a review of game or content on the platform, or inviting other users to join the platform. In order to obtain and verify consent, a video consent verification process is used. Processing continues to 204.

At 204, a first communication session such as a video chat or first video communication session is started. This communication session can be used to capture or view a person providing consent for a minor or child accounts. In some implementations, the first communication session can include an audio communication session for a person providing audio consent. Video and/or audio from the first communication session can be sent to the online gaming platform 102 or the consent verification system 124 for processing to verify consent. The video and/or audio of the first communication system can be analyzed, e.g., by performing detection (e.g. either local or remote detection) of one or more faces in the video, or one or more voices in the audio. Processing continues to 206.

At 206, it is optionally determined whether there is a new person in the video communication session. In some implementations, video analysis can be used to determine the number of people who are present in the video. If the video analysis shows that only one person is in the video, this may signal that there is not an adult there to provide consent. The ability to use signals about how many people are in the video or their approximate age can help expedite the workflow of the operators. For example, the video communication session may have started with a user (e.g., a child) in the video communication session, but the consent and consent verification may be based on an adult giving consent. For example, a system may optionally detect that a new person (e.g., an adult) is present in the video communication session (or was present from the beginning), where the new person is a person that is different from the person (e.g., a child) that was present in the video communication session when the video communication session was initiated. The person providing consent may be present in the video from the beginning and does not necessarily need to be a new person in the video that enters after the video starts. During consent verification, the image of the user (e.g., a child) in the video may be blurred out. Processing continues to 208.

At 208, it is determined whether consent verification has been enabled. For example, after a user has taken an action that generated an indication that consent is require, the system could cause a user interface (e.g., a dialog box) to be displayed, where the user interface includes information to a user that consent verification has been requested (e.g., by the user and/or by the online gaming platform) and requests that the user enable the consent verification by selecting a user interface element (e.g., 503) that indicates approval of starting the consent verification process. For example, if a user (e.g., a child user) attempts to access a feature or aspect of a game that is meant for a more mature audience, the system determines whether consent verification is enabled at which point a parent or other adult user/supervisor of the minor child can decline to provide consent verification and so keep the feature disabled and not continue the video consent verification process. If consent verification is not enabled, processing continues to 210. Otherwise, processing continues to 212.

At 210, any captured consent verification data (e.g., video, audio, or other data) is deleted. For example, consent verification video files, audio files, answer files, etc. can be stored on a user device, an online gaming platform, or the like. Because step 210 is reached when consent verification is not going to be performed, deleting any consent verification data can help preserve the privacy of a user or adult for which the user has requested consent verification and can also help reduce the amount of storage needed on a client device or online gaming platform. Processing can continue to 204 if consent verification is still required.

At 212, a video conference or second video communication session is started. The second video communication session can include one or more consent verifier systems as participants in the consent verification second video communication session. In some implementations, the second video communication session can be started by modifying the first video communication session to include the one or more consent verifier systems as participants in the first video communication session. Video consent can be captured by the client system via camera 114 and can include a person 120 in the video providing consent for one or more features. In some implementations, consent for video capture required to use the system as video must be passed to the operators to verify the consent. The system, however, does not need to hold the video indefinitely and may elect to destroy, delete or remove the video after consent is provided in order to be in compliance with applicable laws around maintaining personally identifiable information. In some implementations, video is captured real time and stored for however long the platform needs to store it for quality control and analysis purposes. By leveraging the system to verify age, the users are providing consent for the video capture. In some implementations, the adult or person providing consent does not need to be in the same room as the user for which consent is required. For example, if the adult is on a different video feed than the child, it will be noted for the operators and may be a factor in approving consent. In some implementations, consent for video capture required to use the system as video can be passed to the operators to verify the consent. The system, however, does not need to hold the video indefinitely and may elect to destroy the video after consent is provided in order to be in compliance with applicable laws in place regarding personally identifiable information.

The consent video can be sent from the client system 110 to the online gaming platform 102 and on to the verification system 124. From the verification system, the video can be sent to one or more verifier systems (e.g., 126-130) and displayed on respective displays (132-136). Consent verification from the verification operators can be received via verification operator system input devices (138-142) such as keyboard, touch screens, etc. In some implementations, consent verification operators do not communicate directly with the child or adult. Consent verification operators may prompt for more information, but that is communicated to the child/adult via the platform through text, pre-recorded audio, video, or user interface elements, etc.

In some implementations, metadata associated with the second video communication session can be analyzed to determine when video of the second video communication session was recorded and, in particular, if the video was recorded just prior to being submitted. If the video was recorded just prior to being submitted, it can indicate that the video is valid for use in consent verification. However, if the video was recorded more than a threshold amount of time prior to consent verification, then the video may not be valid for consent verification. In some implementations, consent can be provided from one adult (e.g., a parent) for multiple users (e.g., kids of the parent) as determined by multiple related accounts (e.g., accounts having the same adult email address or other adult information). Consent from one adult can be associated with one or more of a user, a user account, an avatar, or a screen name and used to enable the features for that account that provided the indication that consent was needed. Processing continues to 214.

At 214, it is determined if consent was obtained and verified (e.g., consent was provided and such consent was determined to be given by an adult). For example, the online gaming platform 102 can receive a consent verification response from the consent verification system 124 that indicates whether consent was verified or not. In some implementations, at least one of the consent verification operator systems includes an automated consent verification system that provide an indication of consent verification based on an automated analysis of the consent video. For example, if the adult is a pre-registered adult associated to user account (e.g., a parent), and if the parent has pre-registered their face (e.g., in a manner similar to face identification systems), then the online gaming platform or verification system could verify that the consent provider is indeed the parent. In another example, computer programs that can predict a person's age from received video stream could be used to determine the likelihood that the consent provider is an adult. The consent verification response can be based on one or more indications from consent verification operator systems. For example, if a majority of consent verification operator systems indicate that consent is verified, then the consent verification system can return a response that indicates consent has been verified. As mentioned above, in some implementations, the verification operators can may be human or machine or both. Adults providing consent must take an affirmative action to provide consent. That action could be by voice, gesture, or input on the device being used. If consent was verified, processing continues to 216, otherwise, processing continues to 210.

At 216, one or more features for which consent was required as determined by indication received at 202 are enabled for the user. In some implementations, consent is given for one or more actions. The platform can guide adult and child through providing consent for each action. For example, if a user was seeking to use communication features within the online gaming platform; those communication features would be enabled following verification of consent. In general, any features that a user was requesting or attempting to access that required consent could be enabled following verification of consent. Also, if consent was verified, the system can display a message to the user such as "Parental consent granted—thank you."

Figure 3:
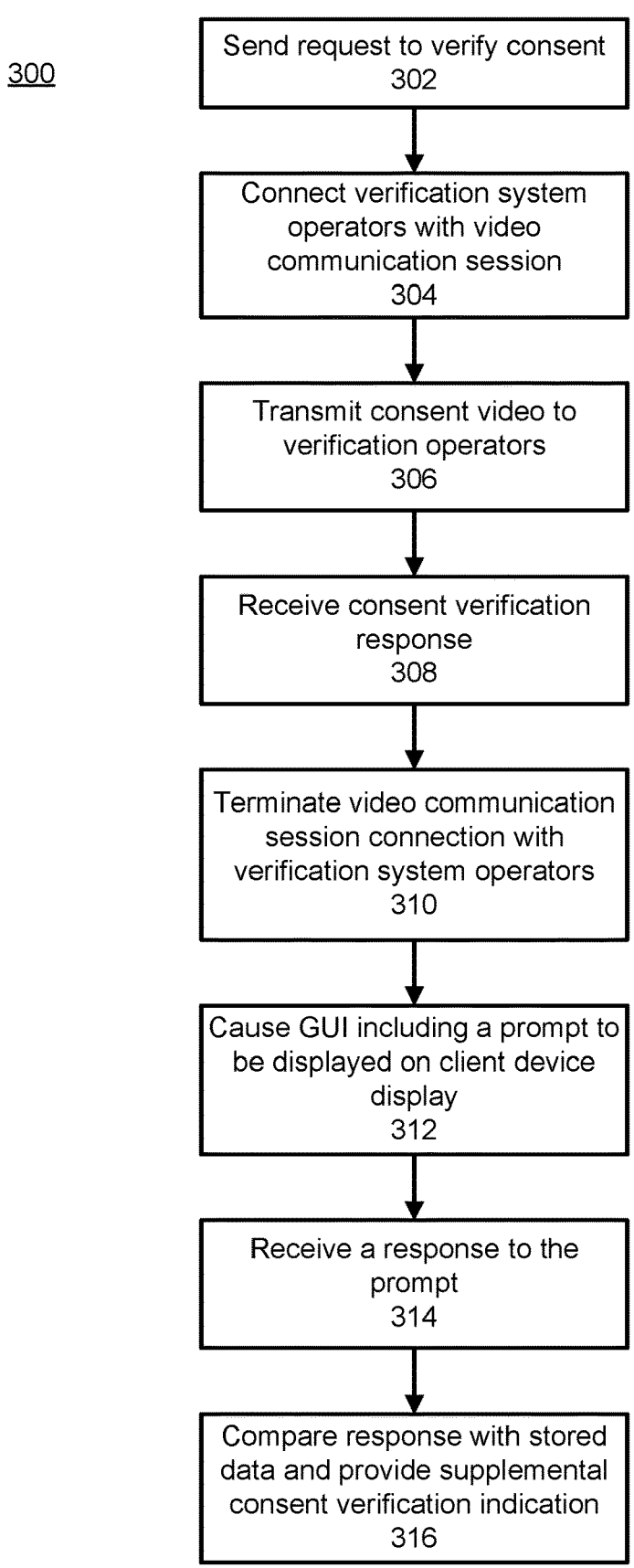
FIG. 3 is a flowchart illustrating an example method to verify consent on an online gaming platform between the online gaming platform and a verification system, in accordance with implementations of the disclosure.

FIG. 3 is a flowchart illustrating method 300 to verify consent in an online gaming platform (e.g., 102), in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In some implementations, the consent verification module 106 executing at the online gaming platform 102 may perform some or all the operations. In other implementations, the consent verification module 106 executing at online gaming platform 102, client device 110, or a combination thereof may perform some or all the operations. Elements of FIG. 1 may be used to help illustrate method 300. It may be noted that in some implementations, method 300 may include the same, different, fewer, or a greater number of operations performed in any order.

Processing begins at 302, where a request to verify consent is sent to a consent verification system. For example, an online gaming platform 102 can send a request for consent verification to a consent verification system 124. The request can include an identifier of the consent verification request such as an identifier of the user account for which consent verification is needed. Processing continues to 304.

At 304, one or more consent verification system operators are connected with a video communication session (e.g., either a first or second video communication session). The consent verification system and/or consent verification operator systems can be joined into a video conference with a video conference or communication session initiated by a client device (e.g., 110). In some implementations, a new video conference can be started that includes the client device and one or more consent verification operator systems. Processing continues to 306.

At 306, consent video is transmitted to the consent verification operators. For example, a person at the user system could be prompted to state whether consent is given for one or more features or functionalities to be enabled and the video of the person giving (or not giving) consent can be captured and sent to the consent verification operators (either as a live stream or as a recorded and transmitted asynchronous video). Processing continues to 308.

At 308, a consent verification response is received. For example, the online gaming system 102 can receive a consent verification response from the consent verification system 124. The consent verification response can include a Boolean (e.g., true if consent verified and false if not), or a consent verification vote count (e.g., 2 of 3 consent verification operators verify consent), etc. The consent verification response can be based on responses received via a graphical user interface (GUI) such as that shown in FIG. 4. Processing continues to 310.

At 310, the video conference or communication session between the online gaming platform and the one or more consent verification operators is terminated. Processing continues to 312.

At 312, optionally, a graphical user interface (GUI) is cause to be displayed on a display device of a client device. For example, the user interface shown in FIG. 5 can be caused to be displayed on a display device of a client device. The GUI can include a question or prompt that typically only the user or a person closely related to the user or with personal information of the user would be able to answer or respond to correctly. The input from the user can include voice, physical gesture, or interacting with an interface (e.g., button, text field, etc.) on the device. Processing continues to 314.

At 314, an answer to the question is received (or a response to a prompt is received). For example, if the question was "what is the birth date of the user," the answer received can include a date. Or, in another example, if the question includes a billing detail of the user account, an email address associated with the user account, or a password associated with the user account, respective answers can include formats corresponding to the questions. Processing continues to 316.

At 316, received answer or prompt is compared with stored data (e.g., data retrieved from a database record associated with the user account), and, if the answer or prompt matches the stored data, supplemental consent verification indication is provided. In some implementations, the verification operator or automated system can determine that the consent was provided. For example, machine learning could be used to determine that an adult provided a thumbs up, a verifier could validate audio conformation, or input on the device (button, text, etc.) can be evaluated by the system. In some implementations, it may be important that the verification happens in real-time (or near real-time) so the verifier knows that the adult is giving consent for the specified action. Matching can include an exact match or a match within a given range of differences or percentage of differences. The supplemental consent verification can be used in conjunction with the consent verification supplied by the consent verification system. For example, for consent to be verified, both the consent verification system response should indicate consent verified and the supplemental consent verification indication should indicate consent verified in order for it to be determined that consent was verified and the one or more features be active or unlocked.

Figure 4:
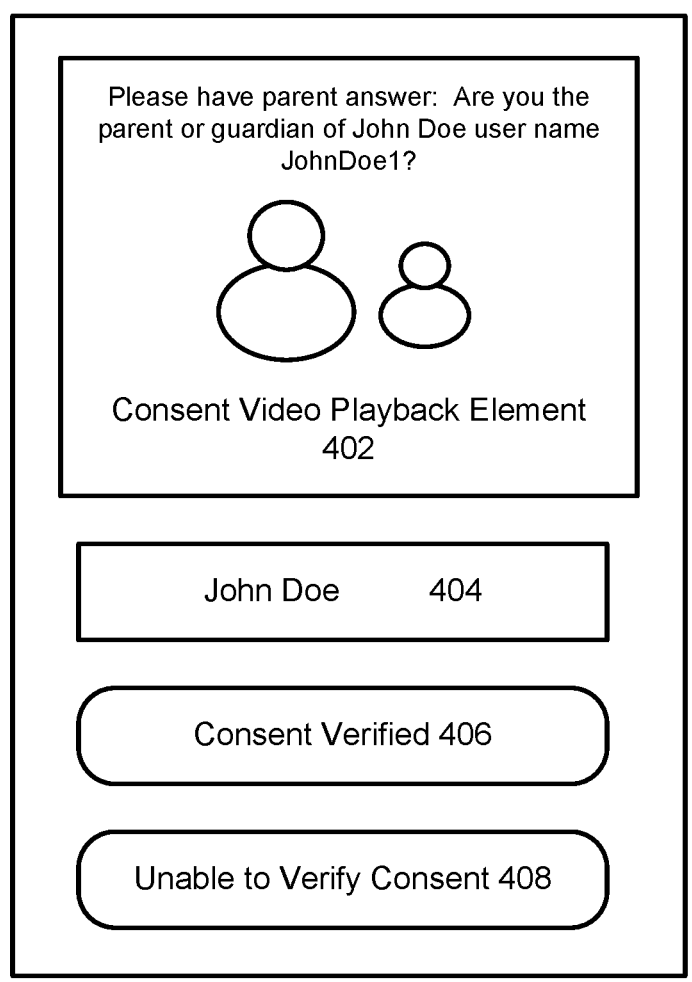
FIG. 4 is a diagram of an example user system graphical user interface to verify consent on an online gaming platform, in accordance with implementations of the disclosure.

FIG. 4 is a diagram of an example verification system graphical user interface (GUI) 400 to verify consent in an online gaming platform, in accordance with implementations of the disclosure. The GUI 400 includes a video playback section 402 that provides a prompt to the verifier of what to ask the adult (or person) giving consent, including a video of two users in this example (user and adult providing consent), to provide a display of the video consent received from the client system 110, for example. The GUI 400 also includes an indication of an account identifier 404, a consent verified button or control 406, and an unable to verify button 408. Upon observing the consent video in the consent video playback section 402, a consent verification operator can vote on whether consent is verified by using the consent verified button or control 506, and the unable to verify button 408.

Figure 5:
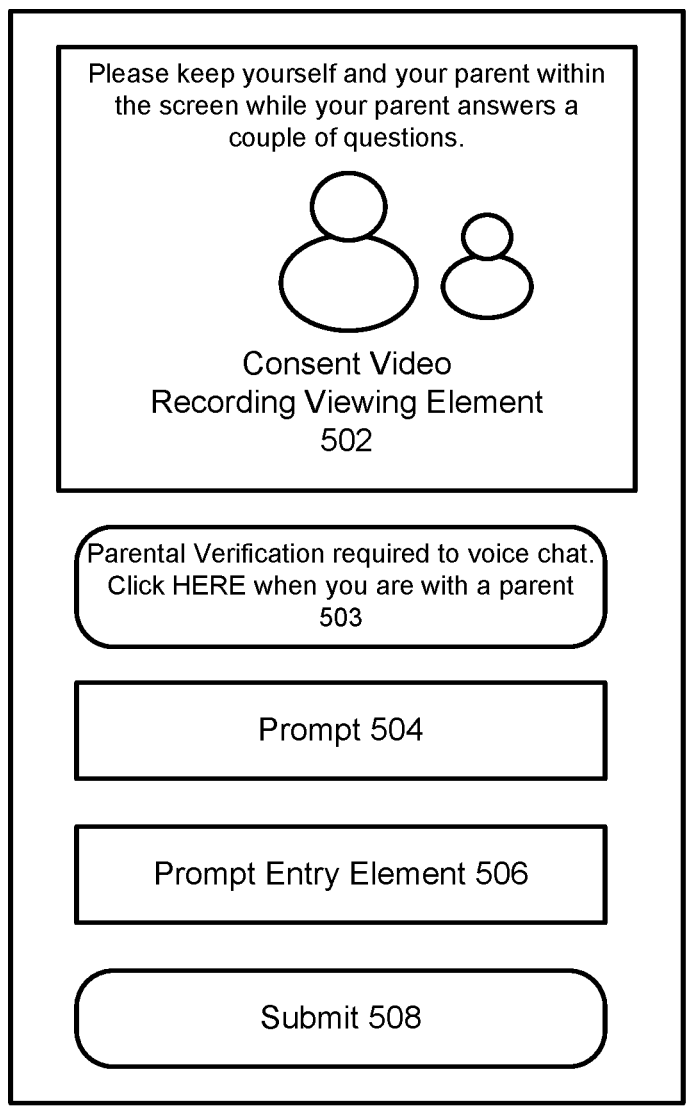
FIG. 5 is a diagram of an example verification system graphical user interface to verify consent on an online gaming platform, in accordance with implementations of the disclosure.

FIG. 5 is a diagram of an example client system graphical user interface (GUI) 500 to verify consent in an online gaming platform, in accordance with implementations of the disclosure. The GUI includes a video consent monitoring element 502 that displays the consent video being captured and/or a video of a consent verification operator along with instructions for the adult to stay visible while providing consent, an element (e.g., button) to initiate consent verification (e.g., user presses button once the adult is in the room and visible in the video frame), an optional question or prompt 504 the question or prompt is used to establish that the person providing consent has knowledge of the user for which consent is being provided, an optional answer element 506 that permits the adult providing consent to provide the answer or response to the question or prompt, and a submit button 508 that causes the answer or response in element 506 to be sent to the online gaming platform or consent verification operator system.

In operation, when a user has or is submitting a consent verification video, the online gaming platform can, via GUI 500, provide a question (e.g., 504) to the user. The user can confirm consent, relationship to the user associated with a user account and/or identity by providing a correct answer to the question via answer element 506, which is then submitted via a submit button element 508. The example of FIG. 5 mentions a parent as an example. In some implementations consent can be provided by an adult or other person appearing to have authority to provide consent.

Figure 6:
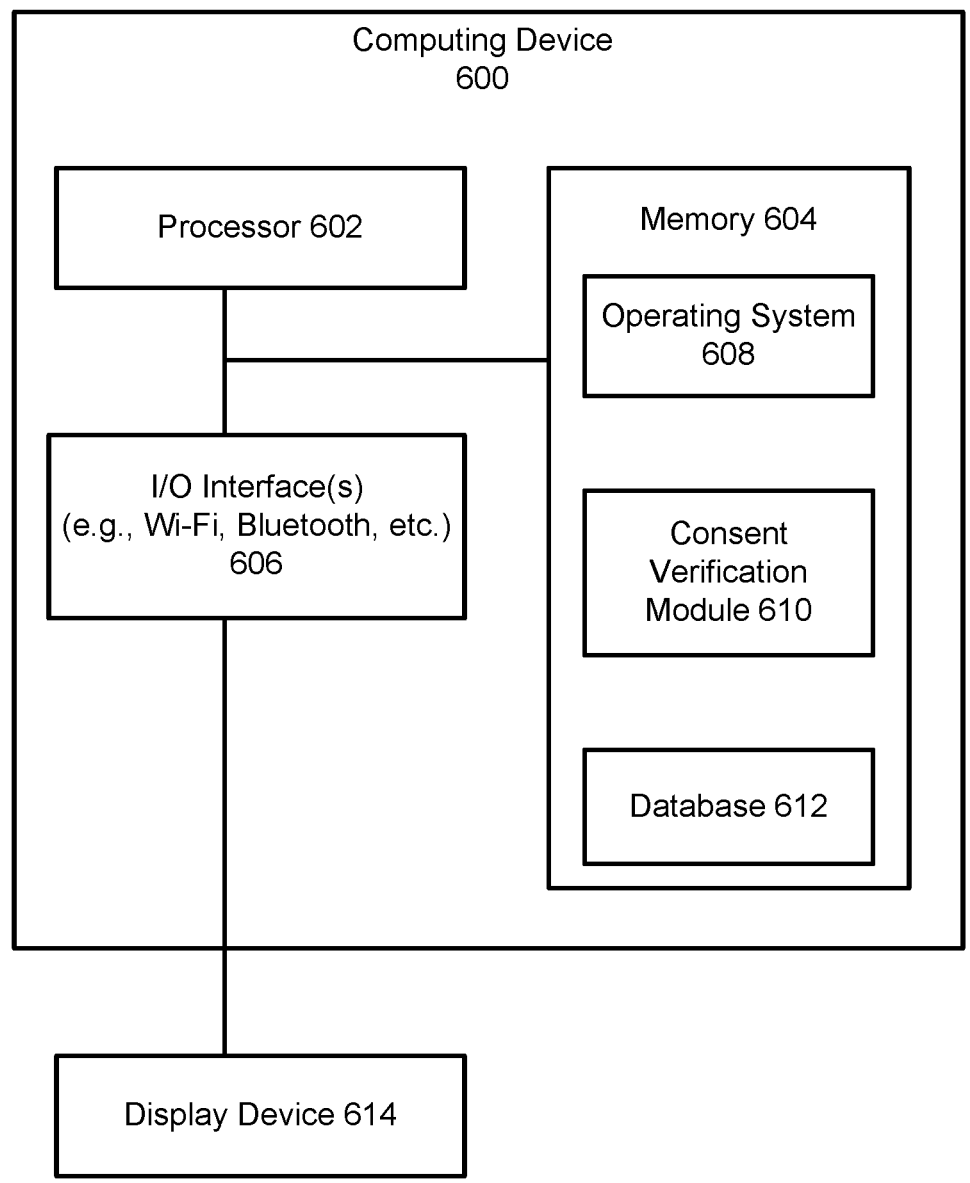
FIG. 6 is a diagram of a computing system configured to verify consent in an online gaming platform environment in accordance with some implementations.

FIG. 6 is a block diagram of an example computing device 600 which may be used to implement one or more features described herein. In one example, device 600 may be used to implement a computer device, (e.g., 102, 110, and/or 124 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, and input/output (I/O) interface 606.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., a consent verification application and application data 612. In some implementations, application 610 can include instructions that enable processor 602 to perform the functions described herein, e.g., some or all of the methods of FIGS. 2 and/or 3.

For example, applications 610 can include a consent verification application or module 612, which as described herein can provide verification of consent by an adult to enable or activate one or more features of an online gaming platform (e.g., 102). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.). Display device 614 is one example of an output device that can be used to display graphical user interfaces (e.g., such as those shown in FIGS. 4 and 5). Display device 614 can be connected to device 600 via local connections (e.g., display bus) and/or via networked connections and can be any suitable display device, some examples of which are described below.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online gaming platform 102 is described as performing operations as described in some implementations herein, any suitable component or combination of components of online gamin platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and/or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    receiving, at a processor, an indication that consent is required to enable one or more features associated with a user account in an online gaming platform;
    initiating, by the processor, a first video communication session between the online gaming platform and a device associated with the user account, wherein the first video communication session includes a first person as a participant in video transmitted from the device associated with the user account;
    detecting, by the processor, a presence of a second person as a participant in the video transmitted from the device associated with the user account in the first video communication session, wherein the second person is participating via the device associated with the user account and wherein detecting the presence of the second person is based on video analysis performed by the processor to determine a number of persons present in the video transmitted from the device;
    receiving, by the processor, an indication that a consent verification process is permitted by the device associated with the user account;
    initiating, by the processor, a second video communication session between the online gaming platform, the device associated with the user account, and one or more consent verification system operator devices associated with a consent verification system, wherein the second video communication session includes participation of the second person and wherein the video transmitted from the device associated with the user account is provided to the one or more consent verification system operator devices;
    receiving, by the processor, a consent verification response from the consent verification system, wherein the consent verification response is based on the video transmitted from the device associated with the user account; and if the consent verification response indicates consent is verified, enabling, by the processor, the one or more features associated with the user account.

2. The method of claim 1, wherein if the consent verification response indicates consent is verified, the consent verification response includes an indication that a majority of one or more consent verification operators corresponding to the one or more consent verification system operator devices provided an indication that the second person in the second video communication session is an adult.

3. The method of claim 1, further comprising:
causing a user interface to appear on a display of the device associated with the user account, wherein the user interface includes a prompt and an element to receive a response to the prompt;
receiving the response to the prompt at the online gaming platform;
comparing the response to the prompt with stored information associated with the user account to determine whether the response is correct; and
enabling the one or more features associated with the user account if both the consent verification response indicates consent is verified and the response to the prompt is correct.

4. The method of claim 3, wherein the prompt corresponds to the stored information, and wherein the stored information corresponds to a detail about the user account.

5. The method of claim 4, wherein the detail about the user account includes one or more of a birth date of a user associated with the user account, a billing detail of the user account, an email address associated with the user account, or a password associated with the user account.

6. The method of claim 1, wherein initiating the second video communications session includes modifying the first video communication session to add the one or more consent verification system operator devices associated with the consent verification system as participants.

7. A system comprising:
a memory; and
a processing device, coupled to the memory, the processing device configured to:
receive an indication that consent is required to enable one or more features associated with a user account in an online gaming platform;
initiate a video communication session between the online gaming platform and a device associated with the user account, wherein the video communication session includes a first person as a participant in video transmitted from the device associated with the user account;
receive an indication that a consent verification process has been initialized by the device associated with the user account;
detect a presence of a second person as a participant in the video transmitted from the device associated with the user account in the video communication session, wherein the second person is participating via the device associated with the user account and wherein detecting the presence of the second person is based on video analysis performed by the processing device to determine a number of persons present in the video transmitted from the device;
in response to detection of the presence of the second person, join one or more consent verification system operator devices associated with a consent verification system to the video communication session, wherein the video transmitted from the device associated with the user account is provided to the one or more consent verification system operator devices;
receive a consent verification response from the consent verification system, wherein at least one of the one or more consent verification system operator devices generates the consent verification response based on programmatically analyzing, without human input, the video transmitted from the device associated with the user to determine whether one of the first person or the second person in the video matches a pre-registered face in the user account, wherein:
if it is determined that one of the first person or the second person in the video matches a pre-registered face in the user account, the consent verification response indicates that consent is verified; and
if it is determined that neither the first person nor the second person in the video matches the pre-registered face in the user account, the consent verification response indicates that consent is not verified; and
if the consent verification response indicates that consent is verified, enable the one or more features associated with the user account.

8. The system of claim 7, wherein if the consent verification response indicates consent is verified, the consent verification response includes an indication that a majority of one or more consent verification operators corresponding to the one or more consent verification system operator devices provided an indication that the person in the video communication session appears to be an adult.

9. The system of claim 7, wherein the processing device is further configured to:
cause a user interface to appear on a display of the device associated with the user account, wherein the user interface includes a prompt and an element to receive a response to the prompt;
receive the response to the prompt at the online gaming platform;
compare the response to the prompt with stored information associated with the user account; and
enable the one or more features associated with the user account if both the consent verification response indicates consent is verified and the response to the prompt is correct.

10. The system of claim 9, wherein the prompt corresponds to the stored information, and wherein the stored information represents a detail about the user account.

11. The system of claim 10, wherein the detail about the user account includes one or more of a birth date of a user associated with the user, a billing detail of the user account, an email address associated with the user account, or a password associated with the user account.

12. The system of claim 7, wherein initiating the video communications session includes modifying the video communication session to add the one or more consent verification system operator devices associated with the consent verification system as participants.

13. A non-transitory computer-readable medium comprising instructions that, responsive to execution by a processing device, cause the processing device to:
receive an indication that consent is required to enable one or more features associated with a user account in an online gaming platform;
initiate a video communication session between the online gaming platform and a device associated with the user account, wherein the video communication session includes a person as a participant in video transmitted from the device associated with the user account;

receive an indication that a consent verification process has been accepted by the device associated with the user account;

detect a presence of a second person as a participant in the video transmitted from the device associated with the user account in the video communication session, wherein the second person is participating via the device associated with the user account and wherein detecting the presence of the second person is based on programmatically analyzing the video transmitted from the device associated with the user account to determine a number of persons present in the video transmitted from the device;

in response to detection of the presence of the second person, join one or more consent verification system operator devices associated with a consent verification system to the video communication session, wherein the video transmitted from the device associated with the user account is provided to the one or more consent verification system operator devices;

receive a consent verification response from the consent verification system, wherein at least one of the one or more consent verification system operator devices generates the consent verification response based on programmatically analyzing, without human input, the video transmitted from the device associated with the user to determine whether one of the first person or the second person in the video matches a pre-registered face in the user account, wherein:

if it is determined that one of the first person or the second person in the video matches a pre-registered face in the user account, the consent verification response indicates that consent is verified; and if it is determined that neither the first person nor the second person in the video matches the pre-registered face in the user account, the consent verification response indicates that consent is not verified; and if the consent verification response indicates that consent is verified, enable the one or more features associated with the user account.

14. The non-transitory computer-readable medium of claim 13, wherein if the consent verification response indicates consent is verified, the consent verification response includes an indication that a majority of one or more consent verification operators corresponding to the one or more consent verification system operator devices provided an indication that the person in the video communication session appears to be an adult.

15. The non-transitory computer-readable medium of claim 13, wherein the instructions are further operable to cause the processing device to:

cause a user interface to appear on a display of the device associated with the user account, wherein the user interface includes a prompt and an element to receive a response to the prompt;

receive the response to the prompt at the online gaming platform;

compare the response to the prompt with stored information associated with the user account; and enable the one or more features associated with the user account if both the consent verification response indicates consent is verified and the response to the prompt is correct.

16. The non-transitory computer-readable medium of claim 15, wherein the prompt corresponds to the stored information, and wherein the stored information represents a detail about the user account.

17. The non-transitory computer-readable medium of claim 16, wherein the detail about the user account includes one or more of a birth date of a user associated with the user, a billing detail of the user account, an email address associated with the user account, or a password associated with the user account.

18. The non-transitory computer-readable medium of claim 13, wherein initiating the video communications session includes modifying the video communication session to add the one or more consent verification system operator devices associated with the consent verification system as participants.

19. The non-transitory computer-readable medium of claim 13, wherein the instructions are further operable to cause the processing device to:

determine that another person is participating in the video communication session; and if the other person is participating in the video communication session, join the one or more consent verification system operator devices associated with the consent verification system to the video communication session.

20. The non-transitory computer-readable medium of claim 13, wherein the processing device further to, prior to joining the one or more consent verification system operator devices, blur at least one of the first person or the second person from the video transmitted from the device associated with the user account.

* * * * *